United States Patent
Amano et al.

(10) Patent No.: US 10,704,590 B2
(45) Date of Patent: Jul. 7, 2020

(54) HALF THRUST BEARING

(71) Applicant: DAIDO METAL COMPANY LTD., Nagoya (JP)

(72) Inventors: Seiji Amano, Inuyama (JP); Toru Watanabe, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 16/258,882

(22) Filed: Jan. 28, 2019

(65) Prior Publication Data
US 2019/0264732 A1 Aug. 29, 2019

(30) Foreign Application Priority Data
Feb. 28, 2018 (JP) ................. 2018-034154

(51) Int. Cl.
*F16C 9/02* (2006.01)
*F16C 17/04* (2006.01)
(Continued)

(52) U.S. Cl.
CPC .............. *F16C 9/02* (2013.01); *F02F 7/0053* (2013.01); *F16C 17/04* (2013.01); *F16C 17/045* (2013.01); *F16C 17/102* (2013.01); *F16C 33/046* (2013.01); *F16C 33/107* (2013.01); *F16C 33/1065* (2013.01); *F16C 33/56* (2013.01); *F16C 2240/42* (2013.01); *H02K 7/09* (2013.01)

(58) Field of Classification Search
CPC .......... F16C 9/02; F16C 17/022; F16C 17/04; F16C 17/045; F16C 17/102; F16C 33/046; F16C 33/103; F16C 33/1065; F16C 33/1075; F16C 33/107; F16C 2360/22; F16C 2240/42; F02F 7/0053
USPC ........ 384/107, 112, 121, 275, 293–294, 305, 384/368, 420, 429
See application file for complete search history.

(56) References Cited

U.S. PATENT DOCUMENTS 3,133,769 A * 5/1964 Drake .................... F16C 33/22
  384/145
5,192,136 A * 3/1993 Thompson ............... F16C 9/02
  384/123
(Continued)

FOREIGN PATENT DOCUMENTS

GB  1509482 A * 5/1978 ............ F16C 17/045
JP  07305721 A * 11/1995 .............. F16C 23/04
(Continued)

*Primary Examiner* — Marcus Charles
(74) *Attorney, Agent, or Firm* — Snyder, Clark, Lesch & Chung, LLP

(57) ABSTRACT

Provided is a semi-annular shaped half thrust bearing. The half thrust bearing has a sliding surface and a back surface opposite to the sliding surface. The sliding surface includes a plurality of recesses. Each recess has a recess surface recessed from the sliding surface toward the back surface. The recess surface is convex toward the back surface in cross-sectional view in a center line direction of the half thrust bearing. The recess surface includes a plurality of grooves. The grooves are recessed from the recess surface toward the back surface. The grooves extend in the center line direction so that smooth surfaces and the grooves are alternately arranged on the recess surface in a horizontal direction of the half thrust bearing.

9 Claims, 7 Drawing Sheets

(51) Int. Cl.
*F16C 33/10* (2006.01)
*H02K 7/09* (2006.01)
*F16C 33/56* (2006.01)
*F16C 17/10* (2006.01)
*F16C 33/04* (2006.01)
*F02F 7/00* (2006.01)

(56) References Cited

U.S. PATENT DOCUMENTS

| | | | | |
|---|---|---|---|---|
| 5,520,466 A * | 5/1996 | Everitt | .................... | F16C 17/10 384/124 |
| 6,095,690 A * | 8/2000 | Niegel | .................... | F16C 17/10 384/288 |
| 6,149,310 A * | 11/2000 | Ono | ..................... | F02F 7/0053 384/294 |
| 6,511,226 B2 * | 1/2003 | Thompson | ................ | F16C 9/02 384/294 |
| 6,736,729 B2 * | 5/2004 | Wang | ..................... | F16D 3/223 29/898.1 |
| 7,354,199 B2 * | 4/2008 | Welch | ....................... | F16C 9/00 384/275 |
| 8,376,618 B2 * | 2/2013 | Lehmann | ................ | F16C 17/10 384/275 |
| 8,393,792 B2 * | 3/2013 | Muramoto | ........... | F16C 33/046 384/429 |
| 9,188,159 B2 * | 11/2015 | Tanaka | .................. | F16C 33/046 |
| 9,664,229 B2 * | 5/2017 | Murrish | ................. | F16C 7/023 |
| 9,797,435 B2 * | 10/2017 | Tanaka | ..................... | F16C 9/02 |

FOREIGN PATENT DOCUMENTS

| | | |
|---|---|---|
| JP | 2000-504089 A | 4/2000 |
| JP | 2001-323928 A | 11/2001 |

* cited by examiner

HALF THRUST BEARING

TECHNICAL FIELD

The present invention relates to a semi-annular-shaped half thrust bearing having a sliding surface for receiving an axial force of a crankshaft of an internal combustion engine.

BACKGROUND OF THE INVENTION

A crankshaft of an internal combustion engine is rotatably supported in its journal part by a lower portion of a cylinder block of the engine via a main bearing constituted by a pair of half bearings combined into a cylindrical shape. One or both of the pair of half bearings are combined with a half thrust bearing for receiving an axial force of the crankshaft. The half thrust bearing is placed on one or both end faces in an axial direction of the half bearing.

The half thrust bearing receives an axial force generated in an axial direction of the crankshaft. That is, the half thrust bearing is provided for the purpose of bearing an axial force applied to the crankshaft, for example, when the crankshaft is connected to a transmission by a clutch.

The crankshaft of the internal combustion engine is supported in its journal part by the lower portion of the cylinder block of the engine via the main bearing constituted by the pair of half bearings. Lubrication oil is fed from an oil gallery in a cylinder block wall, via a through hole in a wall of the main bearing, into a lubrication oil groove formed along an inner surface of the main bearing. Thus, the lubrication oil is supplied into the lubrication oil groove of the main bearing and is then supplied to the half thrust bearing.

In recent years, an oil pump for supplying lubrication oil has been downsized in order to improve fuel economy of the internal combustion engine, and this causes a reduction in an amount of lubrication oil supplied to the bearings. Accordingly, an amount of lubrication oil leaked from end faces of the main bearing decreases, and thus an amount of lubrication oil supplied to the half thrust bearing also tends to decrease. As a measure to address this problem, for example, it has been proposed to improve retainability of lubrication oil by forming thin grooves in parallel to each other on a sliding surface of the half thrust bearing (see JP 2001-323928A, for example) or by forming a plurality of minute recesses on a sliding surface of the half thrust bearing (see JP 2000-504089A, for example).

In recent years, due to the reduction in the amount of lubrication oil supplied to the half thrust bearing as described above, a surface of a thrust collar of the crankshaft directly comes into contact with a sliding surface of the half thrust bearing during operation of the internal combustion engine, and thus friction loss is more likely to occur. Furthermore, in recent years, a shaft diameter of the crankshaft is reduced in order to reduce a weight of the internal combustion engine, and this causes the crankshaft to have lower rigidity than a conventional crankshaft. Thus, during operation of the internal combustion engine, deflection is more likely to occur in the crankshaft, and this tends to cause the crankshaft to vibrate greatly. Accordingly, the surface of the thrust collar is more likely to directly come into contact with a portion of the sliding surface near a circumferential center portion of the half thrust bearing. Thus, damage such as seizure is more likely to occur.

In order to address the situation, JP 2001-323928A and JP 2000-504089A each disclose a configuration for improving retainability of lubrication oil on the sliding surface by forming oil grooves along a circumferential direction on the sliding surface (JP 2001-323928A) and by forming a plurality of minute recesses on the sliding surface (JP 2000-504089A).

However, even if the technique of JP 2001-323928A or JP 2000-504089A is employed, in a case where the deflection of the crankshaft causes the crankshaft to vibrate greatly, it is difficult to prevent seizure when the thrust collar of the crankshaft comes into contact with a portion of the sliding surface near an outer edge or an inner edge in a radial direction, in particular, near the circumferential center portion of the half thrust bearing.

An object of the present invention is to provide a half thrust bearing of a crankshaft of an internal combustion engine, that can suppress seizure during operation of the internal combustion engine.

In an aspect of the present invention, a half thrust bearing is provided for receiving an axial force of a crankshaft of an internal combustion engine. The half thrust bearing has a semi-annular shape, and has a sliding surface for receiving the axial force and a back surface opposite to the sliding surface. The sliding surface includes a plurality of recesses. Each recess has a recess surface recessed from the sliding surface toward the back surface of the half thrust bearing. The recess surface is convex toward the back surface in a cross-sectional view in a direction along a center line of the half thrust bearing. The recess surface includes a plurality of grooves along a center line. The grooves are recessed from the recess surface toward the back surface of the half thrust bearing. The grooves extend along the center line direction V of the half thrust bearing so that smooth surfaces and the grooves are alternately arranged on the recess surface in a horizontal direction H of the half thrust bearing.

Here, the "horizontal direction (H)" of the half thrust bearing indicates a direction connecting center points of both end faces of the half thrust bearing. The "center line direction (V)" (or vertical direction) of the half thrust bearing indicates a direction parallel to the sliding surface and perpendicular to the horizontal direction (H).

According to an embodiment of the present invention, the recesses preferably have a depth of 2 to 50 µm.

According to an embodiment of the present invention, the grooves preferably have a depth of 0.2 to 3 µm. Furthermore, the grooves preferably have a width of 5 to 50 µm. Furthermore, the grooves are preferably arranged with a pitch of 5 to 100 µm.

According to an embodiment of the present invention, the recesses preferably have an opening of a circular shape, an elliptical shape, or a quadrilateral shape. More preferably, the opening has an elliptical shape with a major axis of the elliptical shape extending along the center line direction of the half thrust bearing.

According to an embodiment of the present invention, the recess surface is preferably convex toward the back surface of the half thrust bearing in a cross-sectional view along the horizontal direction of the half thrust bearing.

According to an embodiment of the present invention, the recesses are preferably uniformly located throughout the sliding surface of the half thrust bearing.

DESCRIPTION OF EMBODIMENTS

Embodiments of the present invention and their advantages will be described in detail below with reference to the accompanying drawings. The embodiments below are described merely as examples, and the present invention is not limited to the embodiments.

(General Configuration of Bearing Device)

Figure 1:
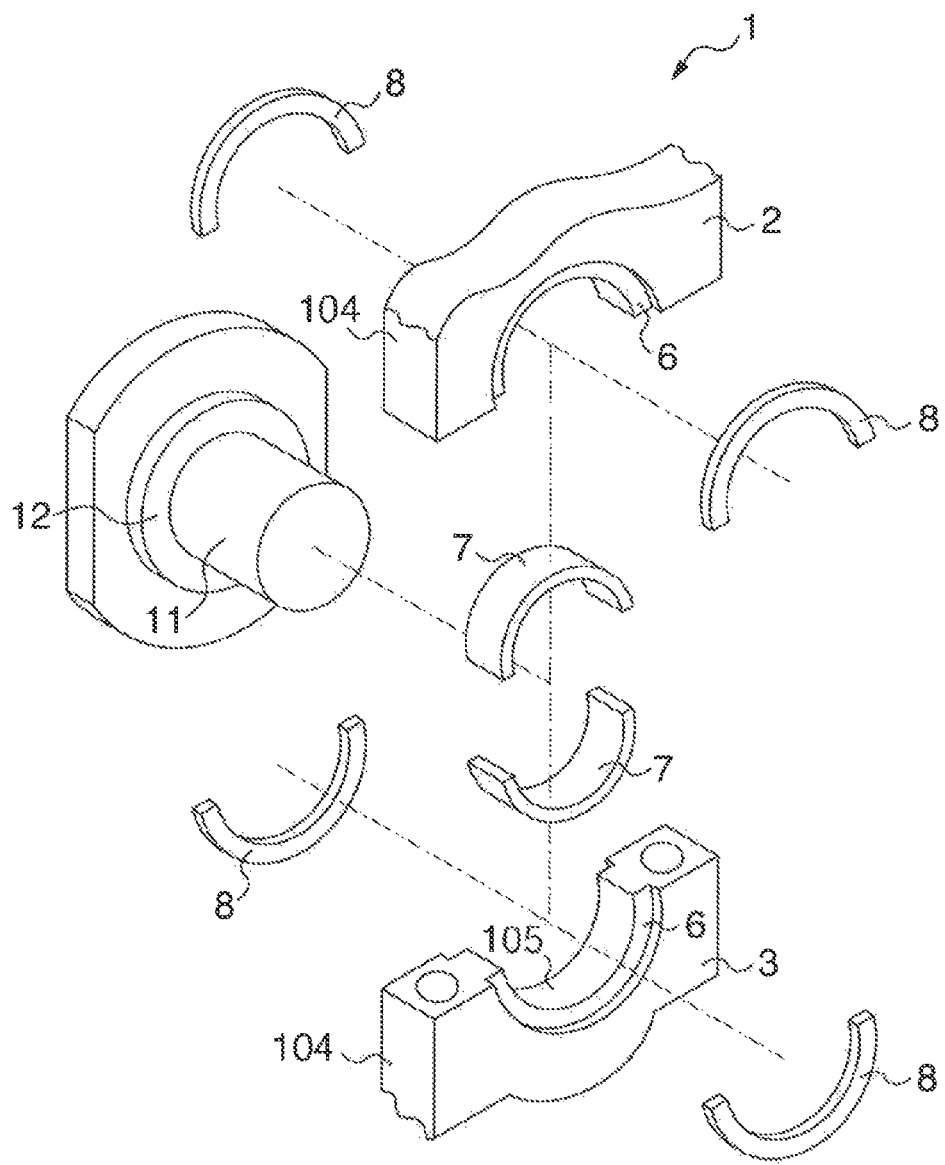
FIG. 1 is an exploded perspective view of a bearing device.
Figure 7:
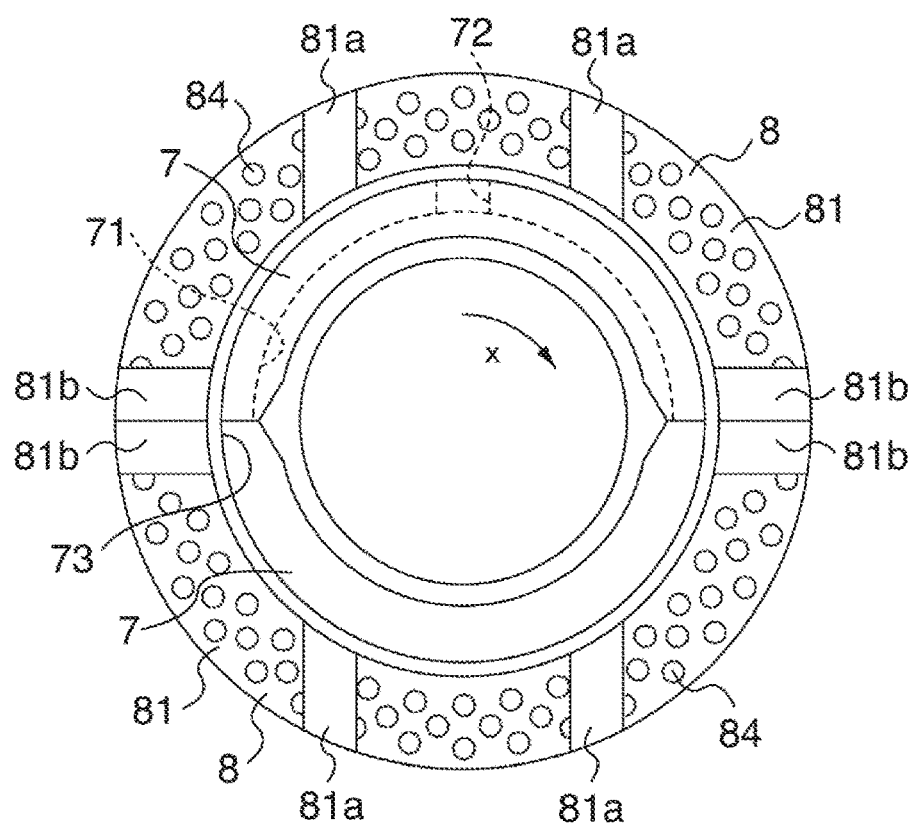
FIG. 7 is a front view of half bearings and a thrust bearing.
Figure 8:
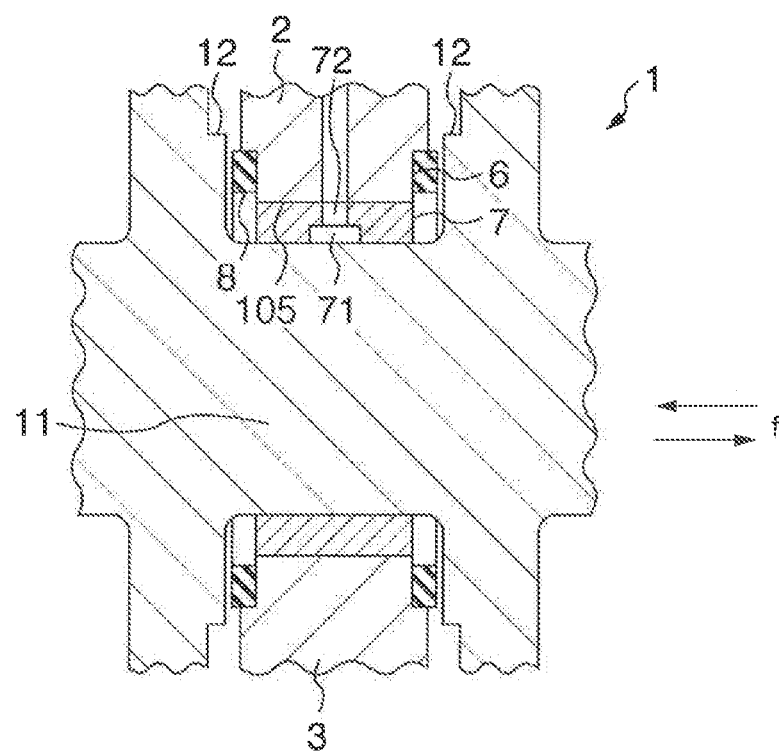
FIG. 8 is a cross-sectional view of the bearing device.

First, with reference to FIGS. 1, 7 and 8, a description will be given of a general configuration of a bearing device 1 including a half thrust bearing 8 of the present invention. As shown in FIGS. 1, 7 and 8, a bearing housing 104 is constituted by a cylinder block 2 and a bearing cap 3 attached to a lower portion of the cylinder block 2. The bearing housing 104 has a bearing hole 105 and seats 6. The bearing hole 105 is circular and passes through side surfaces of the bearing housing 104. The seats 6 each are configured as an annular recess at a peripheral edge of the bearing hole 105 on the side surface. In the bearing hole 105, half bearings 7 combined into a cylindrical shape are fitted. The half bearings 7 rotatably support a journal part 11 of a crankshaft. In the seats 6, the half thrust bearings 8 combined into an annular shape are fitted. The half thrust bearings 8 receive an axial force f (see FIG. 8) via a thrust collar 12 of the crankshaft.

As shown in FIG. 7, the half bearing 7 closest to the cylinder block 2 (on an upper side) among the half bearings 7 constituting a main bearing has an inner surface having a lubrication oil groove 71 and a through hole 72 passing through the half bearing 7 from the lubrication oil groove 71 to an outer surface of the half bearing 7. The lubrication oil groove may be formed in both the upper and lower half bearings. The half bearings 7 each include, at both ends, crush reliefs each adjacent to a surface at which the half bearings 7 are butted against each other.

In the bearing device 1, lubrication oil is pressurized and discharged by an oil pump (not shown), and the lubrication oil is supplied from an inner oil passage of the cylinder block 2, via the through hole 72 passing through a wall of the half bearing 7, into the lubrication oil groove 71 on the inner surface of the half bearing 7. Part of the lubrication oil supplied into the lubrication oil groove 71 is supplied to the inner surface of the half bearing 7. Another part of the lubrication oil enters an opening of an inner oil passage of the crankshaft (not shown) on a surface of the journal part and flows toward a crankpin. Another part of the lubrication oil flows outward from the both ends in a width direction of each of the pair of half bearings 7 constituting the main bearing through a gap between surfaces of the crush reliefs of the half bearings 7 and the surface of the journal part 11 of the crankshaft. The lubrication oil flowing outward from the both ends in the width direction of each of the half bearings 7 mainly flows into a gap between a sliding surface 81 of the half thrust bearing 8 and a surface of the thrust collar 12 of the crankshaft (hereinafter, the gap between the sliding surface 81 and the surface of the thrust collar 12 is referred to as "sliding surface 81/thrust collar 12 gap").

In general, the thrust bearing 8 bears an axial force f from the crankshaft, by pressure generated in oil between the sliding surface of the thrust bearing 8 and the thrust collar surface of the crankshaft.

During operation of the internal combustion engine, when deflection of the crankshaft causes the crankshaft to vibrate greatly, the surface of the thrust collar 12 of the crankshaft repeats movement to be closer to the sliding surface 81 of the half thrust bearing 8 and movement to be away from the sliding surface 81 of the half thrust bearing 8 while changing an inclination angle with respect to the sliding surface 81 or winding. The surface of the thrust collar 12 comes closest to an outer edge or an inner edge in a radial direction of the sliding surface of the half thrust bearing, in particular, near a circumferential center portion of the half thrust bearing (in a range of a circumferential angle of −30° to +30° from a circumferential center toward circumferential ends of the half thrust bearing). While the surface of the thrust collar 12 of the crankshaft is moving closer to a portion of the sliding surface 81 near the circumferential center portion of the half thrust bearing 8, oil in a gap between the surface of the thrust collar 12 of the crankshaft and the sliding surface 81 near the circumferential center portion of the half thrust bearing 8 is compressed to have an increased pressure. The oil having the pressure increased during the movement flows, following the surface of the thrust collar 12, in a circumferential direction of the half thrust bearing 8, and is thus less likely to flow toward the outer edge or the inner edge in the radial direction of the sliding surface 81 of the half thrust bearing 8. Accordingly, the surface of the thrust collar 12 is more likely to directly come into contact with a portion near the outer edge or the inner edge in the radial direction of the sliding surface 81 near the circumferential center portion of the half thrust bearing 8. Thus, damage such as seizure is more likely to occur.

A conventional half thrust bearing (JP 2001-323928A) having a sliding surface including a plurality of circumferential thin grooves extending along an entire circumferential length of the sliding surface has the following problems. While a surface of a thrust collar 12 separated from a portion of the sliding surface near a circumferential center portion of the half thrust bearing is moving relatively closer to the sliding surface, oil between the sliding surface of the half thrust bearing and the surface of the thrust collar flows in the circumferential grooves, and flows out from open ends of the oil groove or the circumferential grooves in a thrust relief into the oil groove or a thrust relief gap. Thus, even when the surface of the thrust collar comes closest to the sliding surface, pressure of the oil does not become sufficiently high. Accordingly, the surface of the thrust collar 12 is more likely to directly come into contact with a portion near an outer edge or an inner edge in a radial direction of the sliding surface near the circumferential center portion of the half thrust bearing. Thus, damage (seizure) is more likely to occur.

Figure 17:
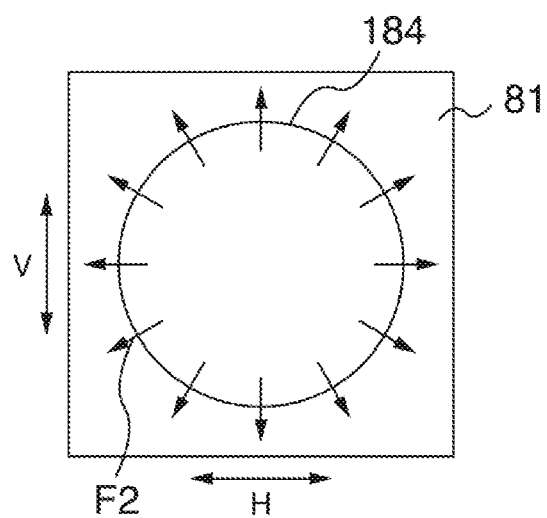
FIG. 17 shows a recess according to a conventional technique, viewed from the sliding surface side.

Furthermore, a conventional half thrust bearing (JP 2000-504089A) having a sliding surface including a plurality of minute recesses has the following problems. When a surface of a thrust collar separated from the sliding surface of the half thrust bearing having the minute recesses moves relatively closer to the sliding surface and the surface of the thrust collar comes closest to the sliding surface, oil in the recess is compressed to have high pressure, and flows out from the recess to a gap (sliding surface/thrust collar gap) between the sliding surface and the surface of the thrust collar. As shown in FIG. 17, in a case where a minute recess 184 has a smooth surface, oil compressed to have high pressure in the recess and overflowing from the recess into the sliding surface/thrust collar gap flows in all directions (F2). Accordingly, the pressure is dispersed to the oil flows flowing in the respective directions. Including an oil flow toward an outer edge or an inner edge in a radial direction of the sliding surface of the half thrust bearing, the oil flows flowing out toward the respective directions from the recess into the gap has a low pressure. Immediately after flowing out from the recess into the gap, therefore, the oil flows change their direction to a circumferential direction of the half thrust bearing, following the rotating surface of the thrust collar. Thus, the amount of oil is small near the outer edge or the inner edge in the radial direction of the sliding surface near a circumferential center portion of the half thrust bearing. Accordingly, the surface of the thrust collar is more likely to directly come into contact with a portion near the outer edge or the inner edge in the radial direction of the sliding surface near the circumferential center portion of the half thrust bearing. Thus, damage (seizure) is more likely to occur.

The present invention addresses such problems of the conventional techniques. An example of a configuration of a half thrust bearing according to the present invention will be described below.

FIGS. 2 to 7 show a first embodiment of the half thrust bearing 8 according to the present invention. The half thrust bearing 8 has a flat semi-annular shape and is made of bimetal produced by applying a thin bearing alloy layer to a back-metal layer made of steel. The half thrust bearing 8 has the sliding surface 81 for supporting the thrust collar 12. The sliding surface 81 is a surface of the bearing alloy layer. The sliding surface 81 is parallel to a back surface which is opposite to a surface of the back-metal layer bonded to the bearing alloy layer. The half thrust bearing 8 may include thrust reliefs 81b on the surface of the bearing alloy layer in regions adjacent to respective circumferential end faces 83. Furthermore, in order to enhance oil supply to the sliding surface 8, the surface of the bearing alloy layer may have two oil grooves 81a between the thrust reliefs 81b on both sides. In this context, the "sliding surface 81" indicates the surface of the bearing alloy layer excluding the thrust reliefs 81b and the oil grooves 81a.

The thrust reliefs 81b have a thickness gradually reduced toward the respective end faces. The thrust reliefs 81b each extend along an entire width of the circumferential end face in the radial direction of the half thrust bearing 8. The thrust reliefs 81b are provided in order to reduce positional deviation between the circumferential end faces 83 of the pair of half thrust bearings 8 caused by, for example, positional deviation that occurs when the half thrust bearings 8 are assembled in the split-type bearing housing 104.

Figure 2:
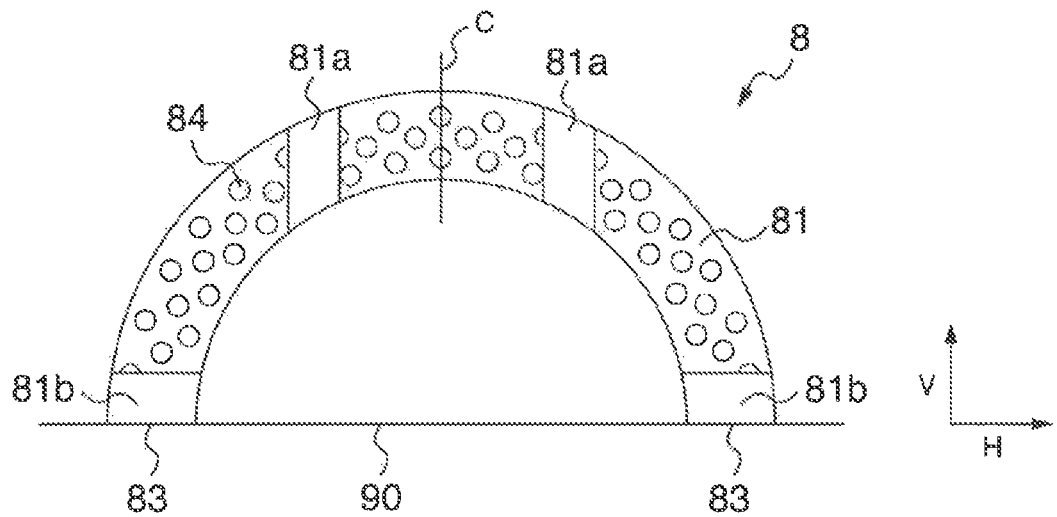
FIG. 2 is a front view of a half thrust bearing according to a first embodiment of the present invention.
Figure 3:
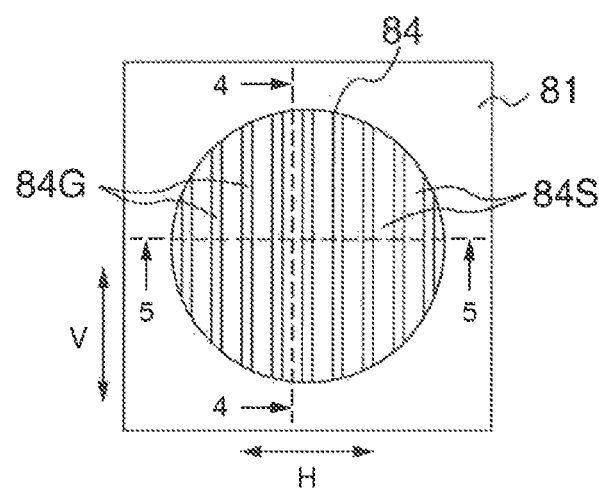
FIG. 3 shows a recess in FIG. 2, viewed from a sliding surface side.

FIG. 2 shows an example of a plurality of recesses 84 on the sliding surface 81 of the half thrust bearing 8. FIG. 3 shows an example of the recess 84 viewed from a sliding surface side. The present invention is not limited to the embodiment. For facilitating understanding, the recesses are exaggerated in the drawings.

In this embodiment, the recesses 84 on the sliding surface 81 of the half thrust bearing 8 have openings having the same shape, area, and size, such as a depth, and are uniformly arranged substantially throughout the sliding surface. The "uniform arrangement" of the recesses 84 on the sliding surface 81 does not indicate strictly geometrically uniform arrangement, but may be approximately or substantially uniform arrangement.

Figure 16:
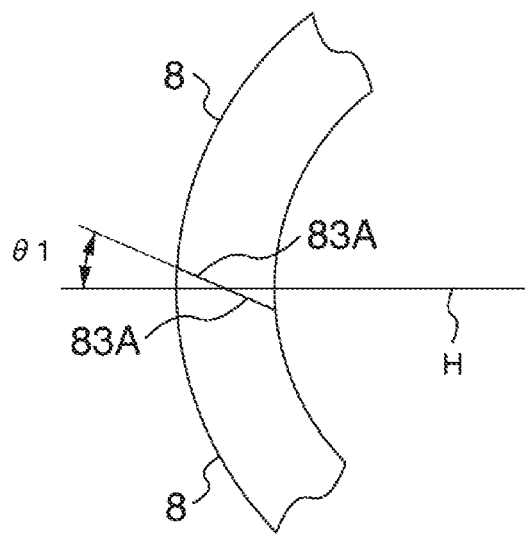
FIG. 16 shows butted portions of a pair of half thrust bearings according to another embodiment of the present invention, viewed from the sliding surface side.

The terms "horizontal direction H" and "center line direction V" of the half thrust bearing 8 will be described below. The horizontal direction H is a direction connecting both center points of the circumferential end faces 83 of the half thrust bearing 8. The center line direction (vertical direction) V of the half thrust bearing is a direction parallel to the sliding surface and perpendicular to the horizontal direction H. When the half thrust bearing 8 has a complete semi-annular shape as shown in FIG. 2, the circumferential end faces 83 extend in a same imaginary plane 90. Accordingly, the center line direction V may also be defined as a direction perpendicular to the imaginary plane 90, and the horizontal direction H may also be defined as a direction parallel to the plane 90 and parallel to the sliding surface 81. However, the half thrust bearing 8 does not need to have the complete semi-annular shape and may have, for example, an inclined end face as shown in FIG. 16. Thus, the horizontal direction H and the center line direction V are defined as the above.

The "center line" is an imaginary line in the sliding surface that passes through a center point of the semi-annular shape of the half thrust bearing 8 and is perpendicular to the horizontal direction H (or the imaginary plane 90). A portion of the half thrust bearing 8 through which the center line passes is referred to as "circumferential center C" of the half thrust bearing.

FIG. 3 shows the recess 84 having a circular opening. The recess 84A has a smooth surface 84S and a plurality of grooves 84G The grooves 84G extend in a direction parallel to the center line direction V of the half thrust bearing 8. Thus, the smooth surfaces 84S and the grooves 84G are alternately arranged in the horizontal direction H in the recess. The term "smooth surface 84S" indicates a smooth surface having no grooves, protrusions, or the like, but may have minute (sufficiently small as compared with the grooves) asperities.

Figure 4:
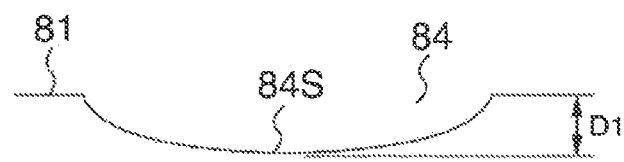
FIG. 4 is a cross-sectional view of a 4-4 cross section (along a center line direction) in FIG. 3.
Figure 5:
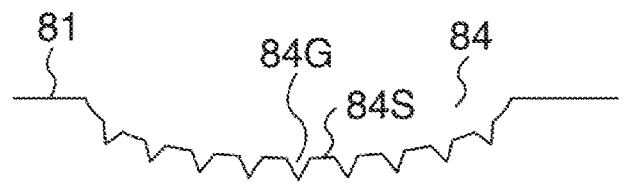
FIG. 5 is a cross-sectional view of a 5-5 cross section (along a horizontal direction) in FIG. 3.

In FIG. 4, the recess surface is recessed toward the back surface of the half thrust bearing 8 in a cross-sectional view (a 4-4 cross section in FIG. 3) cut along the center line direction V That is, the recess surface forms a convex curve toward the back surface. The "recess surface" indicates a smooth surface of the recess excluding the grooves. The groove in cross-sectional view in the center line direction of the half thrust bearing 8 is also recessed from the recess surface toward the back surface of the half thrust bearing 8.

In an embodiment, the recess 84 preferably forms a convex curve toward the back surface also in a cross-sectional view cut along the horizontal direction H of the half thrust bearing. Furthermore, the recess 84 preferably forms a convex curve toward the back surface also in a cross-sectional view in any direction of the half thrust bearing 8. In this context, the "cross section" indicates a cross section perpendicular to the sliding surface 81.

The recess 84 preferably has a depth D1 of 2 to 50 μm, and more preferably of 2 to 25 μm. The depth of the recess 84 is defined as a distance between an imaginary plane extending along the sliding surface over the opening of the recess and a deepest part of the smooth surface of the recess. In a case where the opening of the recess 84 has a circular shape, the opening may have a diameter of 0.05 to 5 mm. In a case where the opening of the recess has a shape other than the circular shape, the opening preferably has the diameter of a circle having an area equal to that of the opening (equivalent circle diameter).

The grooves 84G extend from a peripheral edge of the recess 84 and along the center line direction V, when viewed from the sliding surface side of the half thrust bearing. The grooves 84G are allowed to be slightly tilted (up to 3°) with respect to the center line direction V.

The grooves 84G preferably have a depth D2 of 0.2 to 3 μm. The depth D2 is smaller than the depth D1 of the recess 84. The "depth of the groove" indicates a depth at a deepest part of the groove from the smooth surface adjacent to the groove viewed in cross-sectional view along a width direction of the groove.

Figure 6:
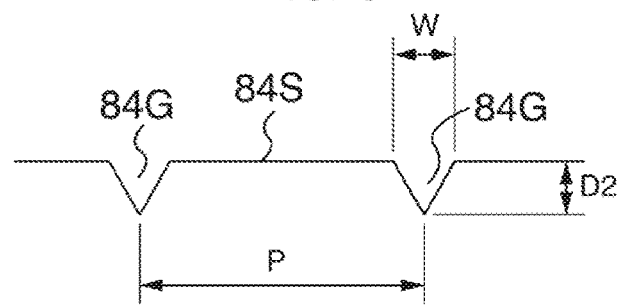
FIG. 6 is a cross-sectional view of grooves along the center line direction.

A width W of the grooves 84G (i.e., a width is a length along the horizontal direction H of the groove 84G on the surface 84S of the recess 84, see FIG. 6) is preferably 5 to 50 μm. The width W is preferably determined such that at least five grooves 84G can be formed in a single recess 84. In the recess 84, the grooves are arranged with a pitch P (i.e., a length between the deepest parts of the adjacent grooves 84G in the horizontal direction H, see FIG. 6) in the horizontal direction H. The pitch is preferably 5 to 100 μm.

Preferably, a depth D2 of the groove 84G, which is a depth from the surface 84S of the recess 84, is made constant over its length or along a direction in which the groove 84G extends, except in circumferential end regions of the recess. Furthermore, the width W of the groove 84G is preferably also made constant over the length (see FIG. 5). A cross section of the groove 84G is preferably V-shaped. However, the shape of the cross section of the groove 84G is not limited to the V-shape and may have another shape.

The depth D2 and the width W of the groove 84G may be changed along the length of the groove 84G In such a case, the "depth of the groove" and the "width of the groove" respectively indicate the maximum depth and the maximum width of the groove 84G, and the maximum values are preferably sized to meet the above described depth and width.

The half thrust bearing 8 of the embodiment may have a sliding layer made of a Cu bearing alloy or an Al bearing alloy on a back-metal layer made of an Fe alloy. However, the half thrust bearing may be constituted only by a Cu bearing alloy or an Al bearing alloy without a back-metal layer. The sliding surface 81 including an inner surface of the recess 84 may have a surface coating or overlay made of one of Bi, Sn and Pb or an alloy thereof, which are softer than the bearing alloy. Alternatively, the surface coating may be made of a resin composition including synthetic resin as a main component. (Even in the case, the surface of the sliding layer is referred to as "a sliding surface" in this context).

However, the surface of the recess 84 preferably does not have such a surface coating. If the surface 84S of the recess 84 or a surface of the groove 84G has such a soft surface coating, when oil contains many foreign substances, the foreign substances are more likely to be embedded and accumulated. If the foreign substances are embedded and accumulated on the surface 84S of the recess 84 or the surface of the groove 84G, turbulence is more likely to occur in the oil flowing in the recess.

As described above, the half thrust bearing 8 of the present invention has the recesses 84 on the sliding surface, and each recess 84 has the smooth surface 84S and the plurality of grooves 84G Thus, the half thrust bearing is less likely to cause damage (seizure). A reason thereof will be described below.

As described above, during operation of the internal combustion engine, when deflection of the crankshaft causes the crankshaft to vibrate greatly, the surface of the thrust collar 12 of the crankshaft repeats movement to be closer to the sliding surface 81 of the half thrust bearing 8 and movement to be away from the sliding surface 81 of the half thrust bearing 8 while changing an inclination angle with respect to the sliding surface 81 or winding. The surface of the thrust collar 12 comes closest to the outer edge or the inner edge in the radial direction of the sliding surface of the half thrust bearing, in particular, near the circumferential center portion of the half thrust bearing.

Figure 9:
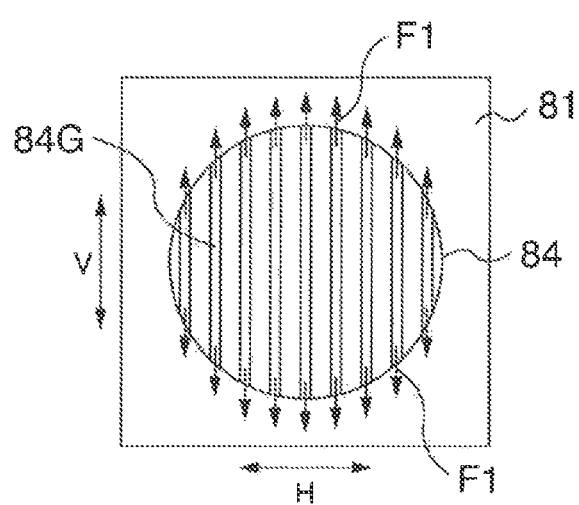
FIG. 9 shows oil flows in the recess in FIG. 3.

FIG. 9 shows a state where the surface of the thrust collar 12 of the crankshaft separated from the sliding surface 81 of the half thrust bearing 8 has moved relatively closer to the sliding surface 81, and the surface of the thrust collar 12 has come closest to the sliding surface 81. In this state, the oil in the recess 84 is compressed to have high pressure and flows out from the recess 84 into the sliding surface 81/thrust collar 12 gap. The surface of the recess 84 has the grooves 84G extending in a direction parallel to the center line direction V of the half thrust bearing 8. Thus, the oil in the recess 84 is guided to the grooves 84G (F1) and flows in the same direction as the center line direction V of the half thrust bearing 8. The oil then flows out into the sliding surface 81/thrust collar gap 12 toward the outer edge and the inner edge in the radial direction of the half thrust bearing 8.

In the sliding surface 81/thrust collar 12 gap, an oil flow following the rotating surface of the thrust collar 12 has been formed. As described above, the oil compressed to have high pressure in the recess 84 mainly becomes the oil flow F1 flowing in the center line direction V of the half thrust bearing 8 in the sliding surface 81/thrust collar 12 gap, and thus the oil flow F1 is strong. Also near the circumferential center portion of the half thrust bearing 8, the oil flow F1 flowing in the center line direction V of the half thrust bearing 8 becomes stronger than the oil flow following the rotating surface of the thrust collar 12, and thus the oil is supplied to the outer edge and the inner edge in the radial direction of the sliding surface of the half thrust bearing 8.

Due to this oil flow, even when the surface of the thrust collar 12 comes closest to the outer edge or the inner edge in the radial direction of the sliding surface 81 of the half thrust bearing 8 near the circumferential center portion of the half thrust bearing, the surface of the thrust collar 12 is less likely to directly come into contact with the outer edge or the inner edge of the sliding surface 81.

In the embodiment, the recesses 84 having the grooves 84G extending in a direction parallel to the center line direction V of the half thrust bearing 8 are located in a region around the circumferential center portion of the half thrust bearing 8 (i.e. in the range of −30° to +30° from the circumferential center C toward the circumferential ends of the half thrust bearing), as well as a region other than the region near the circumferential center portion. This is due to the following reason. That is, as the recess 84 is located closer to the circumferential end face 83, the longitudinal direction of the groove 84G forms a smaller angle with the circumferential direction of the half thrust bearing. Accordingly, the oil flow F1 out from the recess 84 flows in the circumferential direction of the half thrust bearing 8. Thus, following the rotating surface of the thrust collar 12, more oil is more likely to flow toward the circumferential center portion side of the half thrust bearing 8.

Alternative non-limiting embodiments of the present invention will be described below.

Second Embodiment

Figure 10:
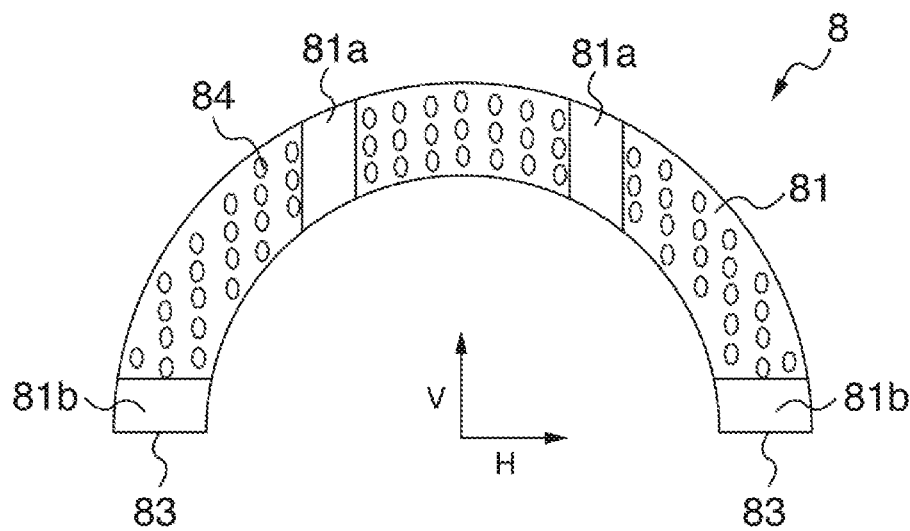
FIG. 10 is a front view of the half thrust bearing according to a second embodiment of the present invention.
Figure 11:
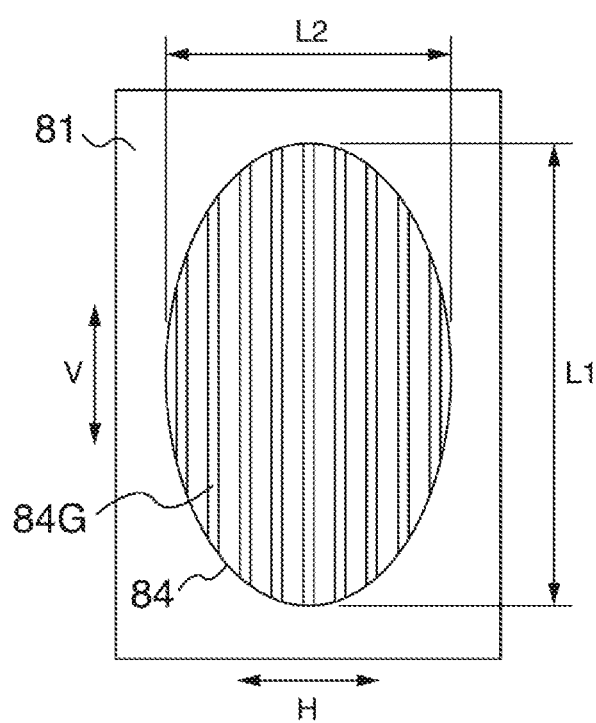
FIG. 11 shows a recess in FIG. 10, viewed from the sliding surface side.

In an embodiment shown in FIGS. 10 and 11, a plurality of recesses 84 are substantially uniformly located throughout the sliding surface, and each recess 84 has an elliptical opening with its major axis L1 extending parallel to the center line direction V of the half thrust bearing 8 and its minor axis L2 extending in the horizontal direction H of the half thrust bearing 8. The major axis L of the elliptical opening of the recess 84 may be slightly tilted (up to 3°) with respect to the center line direction V of the half thrust bearing 8.

The recess 84 may have a curved surface recessed toward the back surface (convex toward the back surface) of the half thrust bearing 8, not only in a cross-sectional view in the center line direction of the half thrust bearing 8 but also in a cross-sectional view in any direction other than the center line direction. The maximum depth D1 from the sliding surface 81 may be the same in the recesses 84.

In the half thrust bearing 8 of the embodiment, each recesses 84 has an elliptical opening with its major axis L1 extending parallel to the center line direction V of the half thrust bearing 8. Accordingly, when the surface of the thrust collar 12 comes closest to a portion of the sliding surface 81 near the circumferential center portion of the half thrust bearing 8, oil in the recess 84 is guided to the groove 84G and the oil is more likely to flow toward the outer edge and the inner edge in the radial direction of the half thrust bearing 8. Thus, the oil is more likely to flow into the sliding surface/thrust collar gap of the half thrust bearing 8 toward the outer edge and the inner edge in the radial direction of the half thrust bearing 8.

Third Embodiment

Figure 12:
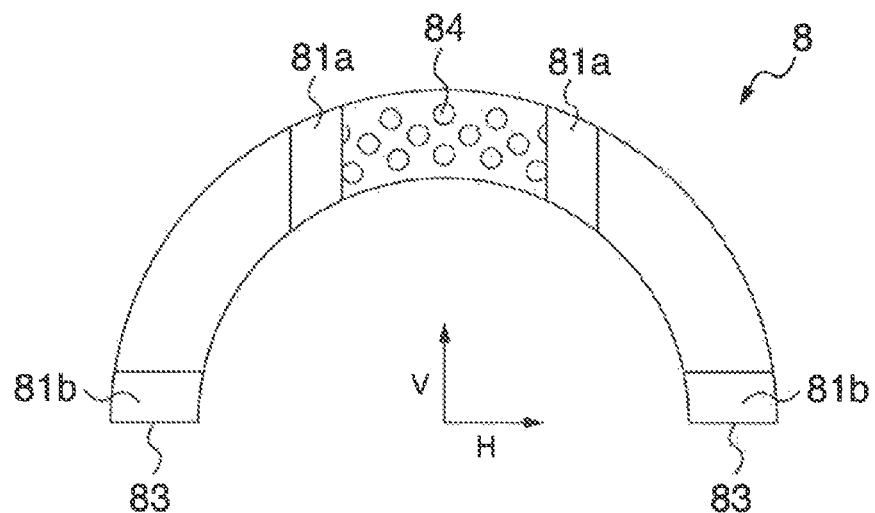
FIG. 12 is a front view of the half thrust bearing according to a third embodiment of the present invention.

In an embodiment shown in FIG. 12, the sliding surface 81 has two oil grooves 81a, and recesses 84 are substantially uniformly located only in a region between the two oil grooves 81a on the sliding surface 81. No recess 84 is located in regions between the oil grooves 81a and respective circumferential end faces 83 (or thrust reliefs 81b). Other configurations are the same as those of the half thrust bearing described in the first embodiment.

As described above, during operation of the internal combustion engine, when deflection of the crankshaft causes the crankshaft to vibrate greatly, the surface of the thrust collar 12 comes closest to the outer edge or the inner edge in the radial direction of the sliding surface 81, in particular, near the circumferential center portion of the half thrust bearing 8, and thus, the surface of the thrust collar 12 is more likely to directly come into contact with the outer edge or the inner edge of the sliding surface 81. Accordingly, the recesses 84 may be formed only in a region of the sliding surface 81 near the circumferential center portion of the half thrust bearing 8 (i.e. a region in the range of −30° to +30° from the circumferential center C toward the circumferential ends of the half thrust bearing) where the surface of the thrust collar 12 is more likely to come into contact with the sliding surface 81.

In a case where the internal combustion engine is configured such that during operation of the internal combustion engine, deflection of the crankshaft causes the crankshaft to vibrate, and the surface of the thrust collar 12 is more likely to come into contact with a portion of the sliding surface 81 near a circumferential end of the half thrust bearing 8, unlike the embodiment, the recesses 84 may be formed only in a region of the sliding surface 81 near the circumferential end face 83 of the half thrust bearing 8.

Fourth Embodiment

Figure 13:
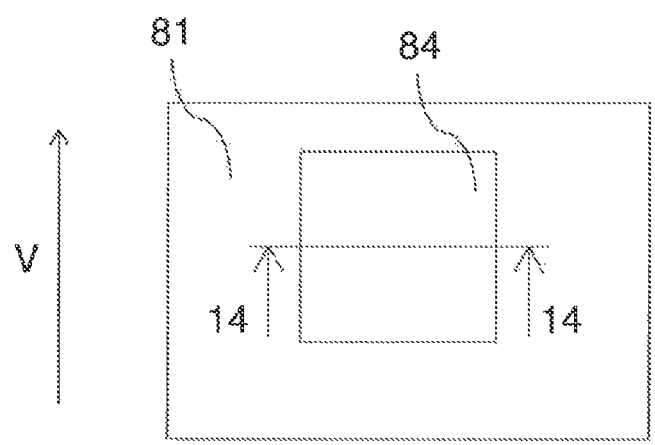
FIG. 13 shows a recess of the half thrust bearing according to a fourth embodiment of the present invention, viewed from the sliding surface side.

An embodiment shown in FIG. 13 shows a recess 84 having a quadrilateral opening. An arrow V indicates the center line direction V of the half thrust bearing 8. Two sides of the quadrilateral opening of the recess extend in the center line direction V of the half thrust bearing 8. Grooves 84G are omitted in FIG. 13.

Figure 14:
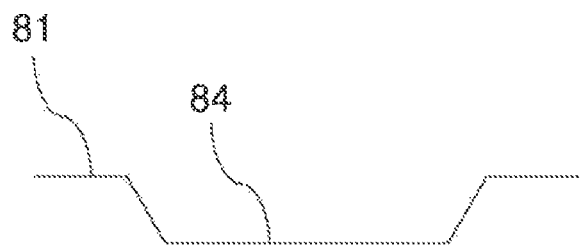
FIG. 14 is a cross-sectional view of a 14-14 cross section (i. e. a cross section along horizontal direction) in FIG. 13.

FIG. 14 shows a 14-14 cross section (i.e. a cross section in the horizontal direction H or across section cut along the horizontal direction H of the half thrust bearing 8) of the recess 84 in FIG. 13. The cross section has a reverse trapezoidal shape, and a surface of the recess 84 is parallel to the sliding surface 81, excluding the surface at both ends of the recess 84 in the radial direction. The grooves 84G are omitted also in FIG. 14. The surface of the recess 84 in a cross-sectional view in the center line direction V of the half thrust bearing 8 is curved and recessed toward the back surface of the half thrust bearing 8.

Fifth Embodiment

Figure 15:
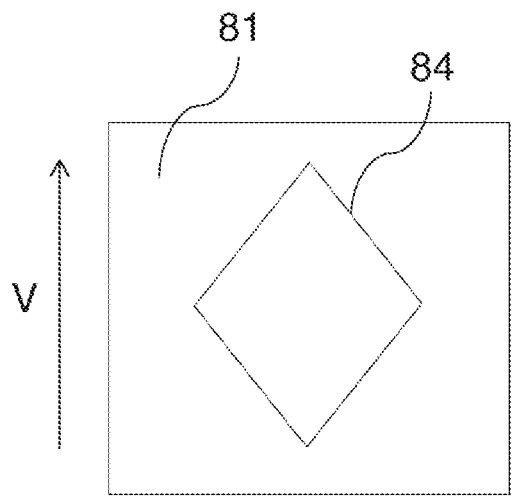
FIG. 15 shows a recess of the half thrust bearing according to a fifth embodiment of the present invention, viewed from the sliding surface side.

FIG. 15 shows a recess 84 having a quadrilateral opening. Unlike in FIG. 13, a diagonal line of the quadrilateral opening of the recess extends in the center line direction V of the half thrust bearing 8. In the recess 84 in FIG. 15, a surface of the recess 84 in a cross-sectional view parallel to the center line direction V of the half thrust bearing 8 is curved and recessed toward the back surface of the half thrust bearing 8. Also, the surface of the recess 84 in a cross-sectional view parallel to the horizontal direction H of the half thrust bearing 8 is curved and recessed toward the back surface. Also in FIG. 15, grooves 84G are omitted.

As stated above, circular, elliptical, and quadrilateral shapes are explained as the shape of the opening of the recess 84. However, these shapes of the opening do not indicate geometrically precise circular, elliptical, and quadrilateral shapes and they may be substantially circular, elliptical, and quadrilateral. Furthermore, the shape of the opening of the recess 84 is not limited to these shapes and other shapes may be applied.

The half thrust bearing of the present invention has been described with the embodiments. The above description is made to the embodiments where the half thrust bearing of the present invention is applied to a thrust bearing constituted by combining a pair of the half thrust bearings into an annular shape for receiving an axial force of a crankshaft of an internal combustion engine. The half thrust bearing of the present invention is also applicable to a single thrust bearing for receiving an axial force of a crankshaft of an internal combustion engine.

As described above, the half thrust bearing of the present invention may be made of bimetal composed of a back-metal layer and a bearing alloy or may be made of only a bearing alloy with no back-metal layer (also in this case, a surface to come into contact with the thrust collar is referred to as a sliding surface, and a surface opposite to the sliding surface is referred to as a back surface).

The shape of the half thrust bearing of the present invention is not limited to a semi-annular shape having a length forming a circumferential angle of 180° in the circumferential direction, and may be a substantially semi-annular shape having a length forming a circumferential angle of slightly smaller than 180° in the circumferential direction. Furthermore, the half thrust bearing of the present invention may have an oil groove and a thrust relief having different shapes other than the shapes shown in the drawings. Alternatively, the half thrust bearing of the present invention may have no oil grooves or thrust reliefs.

In the embodiments, the sliding surface is parallel to the back surface of the back-metal layer, and the sliding surface has a constant thickness. However, the present invention is not limited thereto. The sliding surface may have a changing thickness, and for example, the thickness may be maximum at the inner edge of the sliding surface in the radial direction of the half thrust bearing and continuously decrease toward the outer edge of the sliding surface in the radial direction. Furthermore, the sliding surface may have a changing thickness in the circumferential direction of the half thrust bearing.

In the embodiments, only the sliding surface 81 includes the recesses 84. However, the present invention is not limited thereto, and a surface of the thrust relief 81b or a surface of the oil groove 81a may also include a recess/recesses.

In order to prevent erroneous assembling, circumferential end faces of the respective half thrust bearings 8 may be configured as inclined end faces 83A butted against each other as shown in FIG. 16, at one or both of two butted portions of a pair of half thrust bearings 8. In this case, the inclined end faces 83A are each inclined at a predetermined angle θ1 with respect to a plane passing through the other circumferential end face which is not inclined. Alternatively, instead of the inclined end faces 83A, the circumferential end faces of the respective half thrust bearings 8 may have other shapes, such as a recessed shape and a corresponding protruding shape.

The invention claimed is:

1. A half thrust bearing for receiving an axial force of a crankshaft of an internal combustion engine, the half thrust bearing having a semi-annular shape, and having a sliding surface for receiving axial force and a back surface opposite to the sliding surface,
   wherein the sliding surface comprises a plurality of recesses therewithin, each recess having a recess surface, the recess surface being recessed toward the back surface,
   wherein the recess surface is convexly curved toward the back surface from the sliding surface in a cross-sectional view in any direction perpendicular to the sliding surface of the half thrust bearing,
   wherein the recess surface comprises a plurality of grooves extending along a center line direction, the grooves being recessed from the recess surface toward the back surface, thereby smooth surfaces and the grooves are alternately arranged on the recess surface in a horizontal direction of the half thrust bearing.

2. The half thrust bearing according to claim 1, wherein the recesses have a depth of 2 to 50 μm.

3. The half thrust bearing according to claim 1, wherein the grooves have a depth of 0.2 to 3 μm.

4. The half thrust bearing according to claim 1, wherein the grooves have a width of 5 to 50 μm.

5. The half thrust bearing according to claim 1, wherein the grooves are arranged with a pitch of 5 to 100 μm.

6. The half thrust bearing according to claim 1, wherein the recesses have an opening of a circular shape, an elliptical shape, or a quadrilateral shape.

7. The half thrust bearing according to claim 1, wherein the recess surface is convex toward the back surface in a cross-sectional view along the horizontal direction.

8. The half thrust bearing according to claim 1, wherein the recesses are uniformly located throughout the sliding surface of the half thrust bearing.

9. The half thrust bearing according to claim 1, wherein the recesses have an opening of an elliptical shape, a major axis of the elliptical shape extending in the center line direction of the half thrust bearing.

* * * * *